United States Patent
Post

(10) Patent No.: US 10,393,173 B2
(45) Date of Patent: Aug. 27, 2019

(54) HALBACH-ARRAY LEVITATING PASSIVE MAGNETIC BEARING CONFIGURATION

(71) Applicant: Lawrence Livermore National Security, LLC, Livermore, CA (US)

(72) Inventor: Richard F Post, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 277 days.

(21) Appl. No.: 15/181,317

(22) Filed: Jun. 13, 2016

(65) Prior Publication Data
US 2017/0356492 A1    Dec. 14, 2017

(51) Int. Cl.
H02K 7/00 (2006.01)
F16C 32/04 (2006.01)
H02K 7/09 (2006.01)

(52) U.S. Cl.
CPC ...... F16C 32/0414 (2013.01); F16C 32/0408 (2013.01); F16C 32/0417 (2013.01); F16C 32/0425 (2013.01); F16C 32/0427 (2013.01); H02K 7/09 (2013.01)

(58) Field of Classification Search
CPC .. F16C 32/04; F16C 32/0414; F16C 32/0425; H02K 7/09

USPC .......................................................... 310/90.5
See application file for complete search history.

(56) References Cited

U.S. PATENT DOCUMENTS

| 5,495,221 | A | 2/1996 | Post |
| 5,847,480 | A | 12/1998 | Post |
| 8,009,001 | B1 | 8/2011 | Cleveland |
| 2008/0122308 | A1* | 5/2008 | Mleux ............. F16C 32/044 310/90.5 |
| 2014/0132102 | A1 | 5/2014 | Peng et al. |
| 2014/0354243 | A1 | 12/2014 | Oelofse |
| 2015/0171694 | A1 | 6/2015 | Walsh |

FOREIGN PATENT DOCUMENTS

WO    2015-148719 A1    10/2015

OTHER PUBLICATIONS

International Search Report and Written Opinion for PCT/US2017/033692 corresponding to U.S. Appl. No. 15/181,316, 10 pages.

* cited by examiner

*Primary Examiner* — Naishadh N Desai
(74) *Attorney, Agent, or Firm* — John P. Wooldridge

(57) ABSTRACT

Novel configurations of levitating passive magnetic bearing configurations are described. Such configurations can be used for the precise control of the magnitude and sign of the bearing stiffness, thereby facilitating the overall design of the system in ways that are not possible with conventional attractive or repelling bearing elements.

8 Claims, 8 Drawing Sheets

HALBACH-ARRAY LEVITATING PASSIVE MAGNETIC BEARING CONFIGURATION

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Field of the Invention

The present invention relates to a dynamically stable, passive, totally magnetically energized bearing/suspension system that does not require eclectically activated servo controlled systems to attain a stable equilibrium at operating speed, and more specifically, it relates to means for adjusting passive magnetic bearing stiffness.

Description of Related Art

U.S. Pat. No. 5,495,221 describes an invention that achieves a state of stable equilibrium above a critical speed by use of a collection of passive elements using permanent magnets to provide their magneto-motive excitation. The magnetic forces exerted by these elements, when taken together, levitate the rotating object in equilibrium against external forces, such as the force of gravity or forces arising from accelerations. At the same time, this equilibrium is made stable against displacements of the rotating object from its equilibrium position by using combinations of elements that possess force derivatives of such magnitudes and signs that they can satisfy the conditions required for a rotating body to be stably supported by a magnetic bearing system over a finite range of those displacements. This prior invention can be described as a magnetic bearing system containing at least two discrete subsystems, at least one of which is energized by permanent-magnet material. (More typically, three to four subsystems would be employed). These subsystems, when properly disposed geometrically, act together to support a rotating element in a state of dynamic equilibrium. However, owing to the limitations imposed by Earnshaw's Theorem, the magnetic bearing systems do not possess a stable equilibrium at zero rotational speed. Therefore, means were provided to hold the suspended system in equilibrium until its speed has exceeded a low critical speed where dynamic effects take over and thereby permit the achievement of a stable equilibrium for the rotating object.

It is desirable to provide techniques for adjusting the magnitude and/or reversing the sign of the stiffness of the passive bearing at small gaps. The present invention provides such techniques.

SUMMARY OF THE INVENTION

The invention represents an improvement of the design of passive bearing elements of the general type described in U.S. Pat. No. 5,495,221, "Dynamically Stable Magnetic Suspension/Bearing System." The improvement involves the use of a primary and one or more secondary Halbach arrays to provide the levitating force for a bearing system. U.S. Pat. No. 5,847,480 describes example stabilization techniques for bearing systems. The purpose of the secondary arrays is to provide a means for adjusting the magnitude and/or reversing the sign of the stiffness of the passive bearing at small gaps. Among the advantages of the new configuration over previous passive magnetic bearing assemblies is that it becomes possible to locally reverse the sign of the stiffness of an attractive bearing element without substantially reducing its levitating force. Another advantage is that it provides a means of "fine tuning" the attractive force of a bearing pair for the purpose of matching the load at a chosen small gap, including the possibility of compensating for the temperature variation of the strength of the permanent magnet material from which the bearing is made.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

A Halbach array stabilizer and passive magnetic bearing system is described U.S. Pat. No. 5,847,480, "Passive Magnetic Bearing Element with Minimal Power Losses". The present document describes improved levitating passive magnetic bearing configurations that facilitates the action of the stabilizer elements, whether they be designed to stabilize the levitating bearing against axial displacements or against lateral displacements. Using the new levitating configuration, both the stiffness requirements and the power losses of the stabilizer elements can be reduced substantially. Another consequence of employing the new levitating bearing configuration is that it can facilitate the accurate axial location of the levitated load. This property can be very important in, for example, the design of flywheel energy storage systems that employ an electrostatic generator/motor where the gap between the rotor and stator electrodes must be closely controlled.

Figure 1:
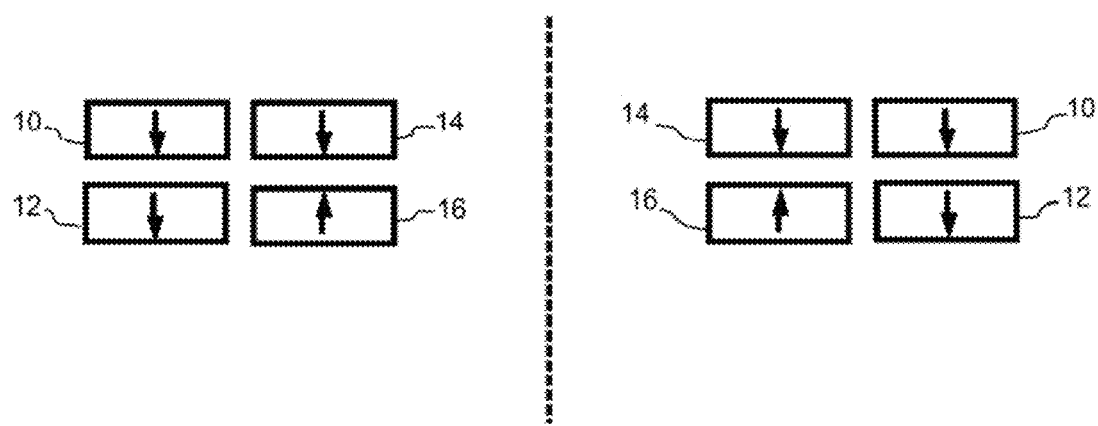
FIG. 1 is a schematic representation of passive magnetic bearing configuration employing outer primary (attracting) Halbach arrays and inner secondary arrays of shorter radial wavelength operating in a repelling mode.

One of the possible geometric configurations of the new levitating bearing is shown in FIG. 1. The cross-sectional view of the figure shows the new bearing configuration as consisting of two annular dual Halbach arrays. The "primary" dual array consists of upper annular array 10 and lower annular array 12. The "secondary" array consists of upper annular array 14 and lower annular array 16. The stators and rotors of the arrays would be linked to each other so that the rotating parts would move axially as a unit, while the stator elements remain fixed in position. As shown schematically in the drawing the upper array 10 and the lower array 12 of the primary Halbach array assembly are designed to attract each other, thus providing the levitating force. The upper array 14 and the lower array 16 of the secondary array are designed to repel one another. The role of the secondary array is to provide a means of locally controlling the levitating force and the stiffness variations of the primary elements. This is accomplished in some embodiments by providing a mechanism for adjusting the gap between array 14 and array 16. Thus, the closer that these two arrays get to one another, the greater the repelling force they produce. This repelling force counteracts some of the attracting force that exists between the primary array 10 and primary array 12.

Note that this new concept, involving primary and secondary Halbach array elements, could be applied both to bearing systems that levitate by a net attractive force that lifts the load, or systems that levitate by providing a net repelling levitating force from the primary elements, while the secondary elements operate in an attractive mode. Geometrically, the primary and secondary arrays may be of different radii and may therefore be coplanar, or they may have comparable radii and be located coaxially.

Figure 8:
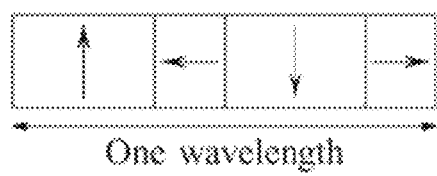
FIG. 8 shows one wavelength of a linear Halbach array segment and illustrates the rotation of the magnetic field direction along the array.

In one of the possible embodiments of the concept, by making the wavelength of the dual secondary Halbach arrays substantially shorter than that of the dual primary arrays, and, if necessary, displacing the lower face of the stator element of the secondary array upward from the lower face of the primary array, a localized reduction in negative stiffness can be made to occur when the gap between the rotor element and the stator element of the primary array is small, without a concomitant major decrease in the levitating force at that gap. FIG. 8 shows one wavelength of a linear Halbach array segment and illustrates the rotation of the magnetic field direction along the array.

In another embodiment of the concept, the parameters can be adjusted so that a highly localized region of positive stiffness at small gaps can be achieved. Within this region it is possible to levitate a chosen load, with stability against vertical displacements, using attractive forces. In this case a radial stabilizer can be employed. Such a situation is impossible to achieve with a single attractive bearing pair, which will always exhibit negative stiffness, and thus be unstable against vertical displacements at any gap.

Figure 2A:
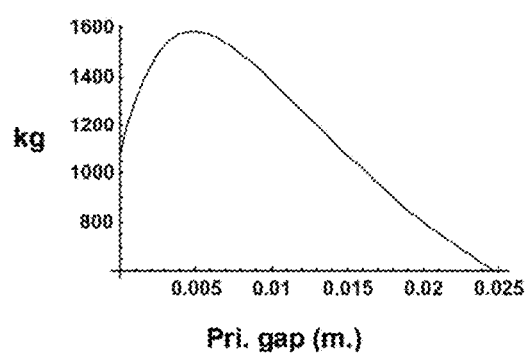
FIG. 2A shows the levitating force of a dual Halbach array pair levitating passive magnetic bearing with reversal of sign of stiffness at small gaps.
Figure 2B:
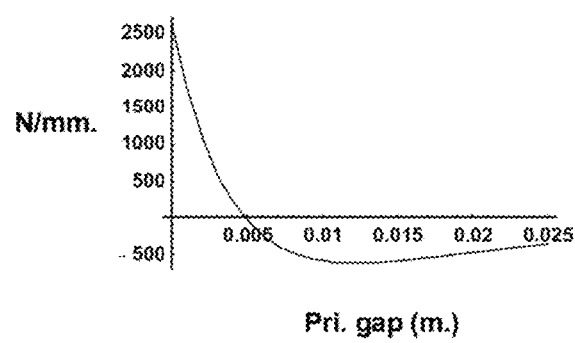
FIG. 2B shows the stiffness of a dual Halbach array pair levitating passive magnetic bearing with reversal of sign of stiffness at small gaps.

The embodiment described above can create a highly localized stable point against axial motion for a properly sized load. Then, radial stabilizers would be used to stabilize against radial displacements. An example of the stiffness characteristics of this type of embodiment is illustrated in the computer-generated plots shown in FIGS. 2A and 2B. As shown, the attractive force has a maximum at small gaps, corresponding to the transition from negative stiffness at larger gaps and positive stiffness for smaller gaps. Properly sized loads will therefore be stably levitated with their axial position maintained within this well-defined region.

Figure 3A:
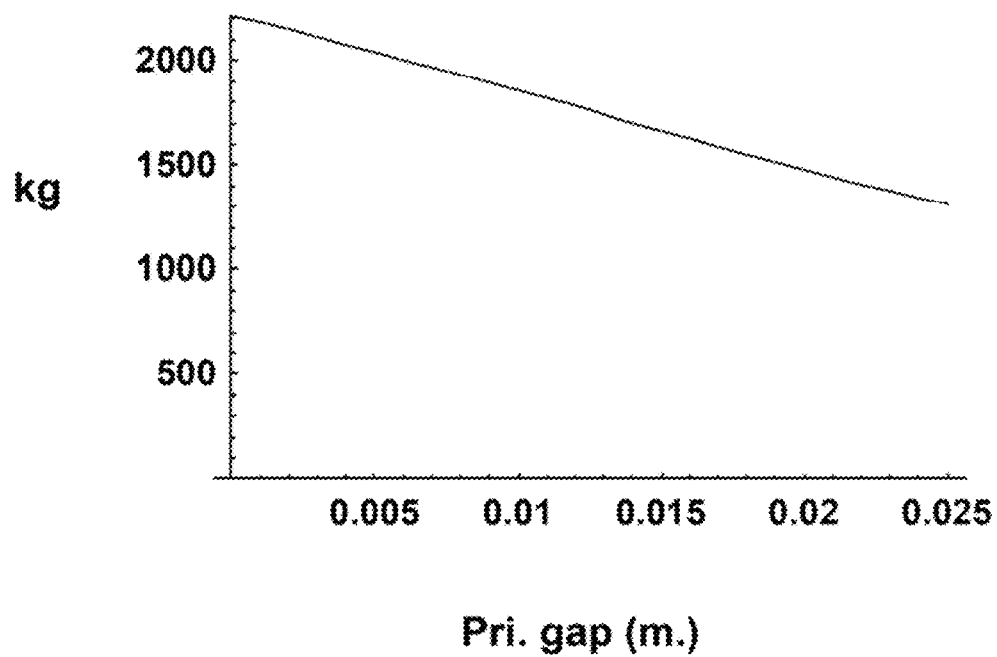
FIG. 3A shows the levitating force of a Halbach array pair levitating passive magnetic bearing with reduced negative stiffness at small gaps.
Figure 3B:
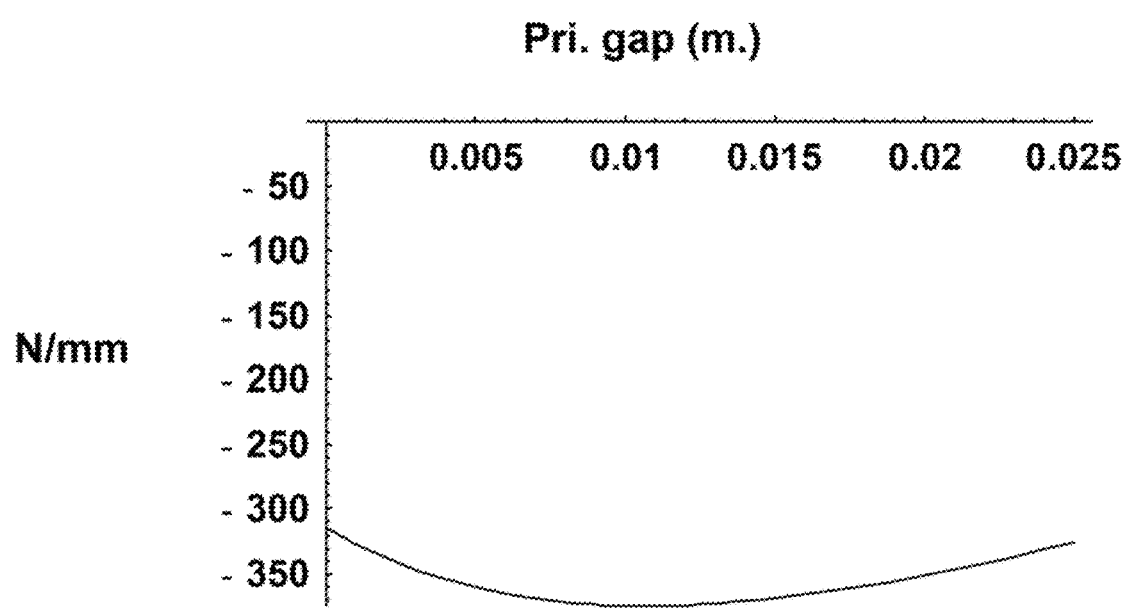
FIG. 3B shows the stiffness of a Halbach array pair levitating passive magnetic bearing with reduced negative stiffness at small gaps.
Figure 4:
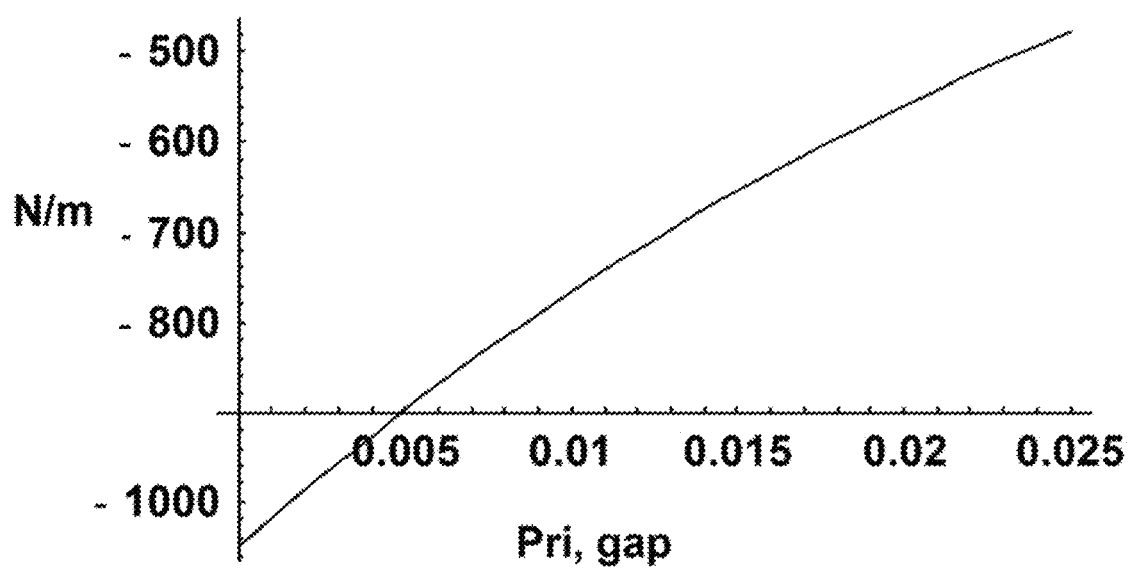
FIG. 4 shows a plot of stiffness vs gap for a single attracting Halbach array pair showing the larger value of stiffness as compared to that obtained with the use of the new levitating array.

As another example, the new bearing assembly can be used to effect a major reduction in the negative (axially unstable) stiffness of the bearing assembly, thus facilitating the design of axial stabilizers such as those described in U.S. Pat. No. 5,847,480. An example of this type of embodiment is shown in computer-generated plots in FIGS. 3A and 3B, showing negative stiffness of the bearing element at small gaps, while still maintaining a large levitation force. Reducing the negative stiffness lowers the design constraints on the axial stabilizer and can, among other desirable results, lead to lower resistive power losses in that element. FIG. 4 shows a plot of the stiffness vs gap for a conventional levitating Halbach array pair having the same dimensions as the primary arrays of FIGS. 2A through 3B. Note the much larger values of the stiffness in FIG. 4 as compared to those of FIGS. 2A through 3B. The large stiffness values shown in FIG. 4 would make the design of the stabilizer element much more demanding.

Note that there may be circumstances where it is desirable to use more than one secondary Halbach array pair in the bearing assembly, in order to establish greater control over the axial stiffness and levitation force. In this way it should be possible, for example, to more closely limit the variations in the axial position of the force equilibrium such as may occur with changes in temperature.

Figure 5:
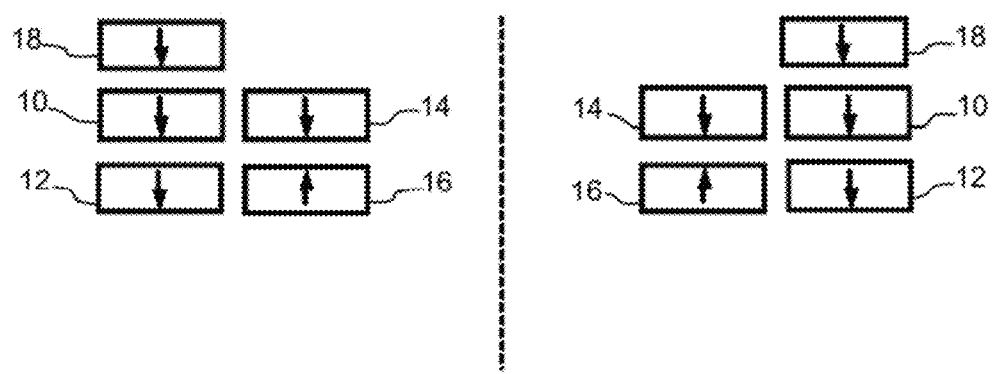
FIG. 5 is a schematic representation of a passive magnetic bearing configuration employing outer primary (attracting) Halbach arrays with a secondary array above it with a variable gap that allows "fine tuning" of the attractive force to match the load and/or to provide temperature compensation by varying the gap, using bi-metallic metal strip supports, for example and also shown is the inner secondary array pair having a shorter radial wavelength and operating in a repelling mode.

One example of an embodiment using an additional secondary array is shown schematically in FIG. 5. The configuration of FIG. 5 utilizes the design of FIG. 1 and further includes an extra secondary array 18. In this embodiment the extra secondary array is located above the primary array with a gap between them. By varying this gap, the attractive force of the bearing can be increased or decreased, to allow "tuning" of the bearing so as to control the location of force equilibrium with a given load. Then, if the gap between the upper face of the primary array and the lower face of this secondary array is made to vary with temperature (by using bi-metallic supporting struts, for example), then the position of axial force equilibrium can be made to be insensitive to temperature variations of the magnet elements.

The employment of more than one secondary array, with each array having a different wavelength and, if needed, a different gap from that of the primary array, can lead to an even more precise control of the stiffness and/or the position of axial equilibrium. In effect it allows the designer to approximate the desired variation of attraction or repulsion with a sum of three or more exponential functions of differing wavelength and polarity. Such a situation could arise, for example, in the design of flywheel energy storage systems that employ an electrostatic generator/motor. Such generator/motors typically require a small and closely controlled axial gap between their stator and rotor electrodes.

Figure 6:
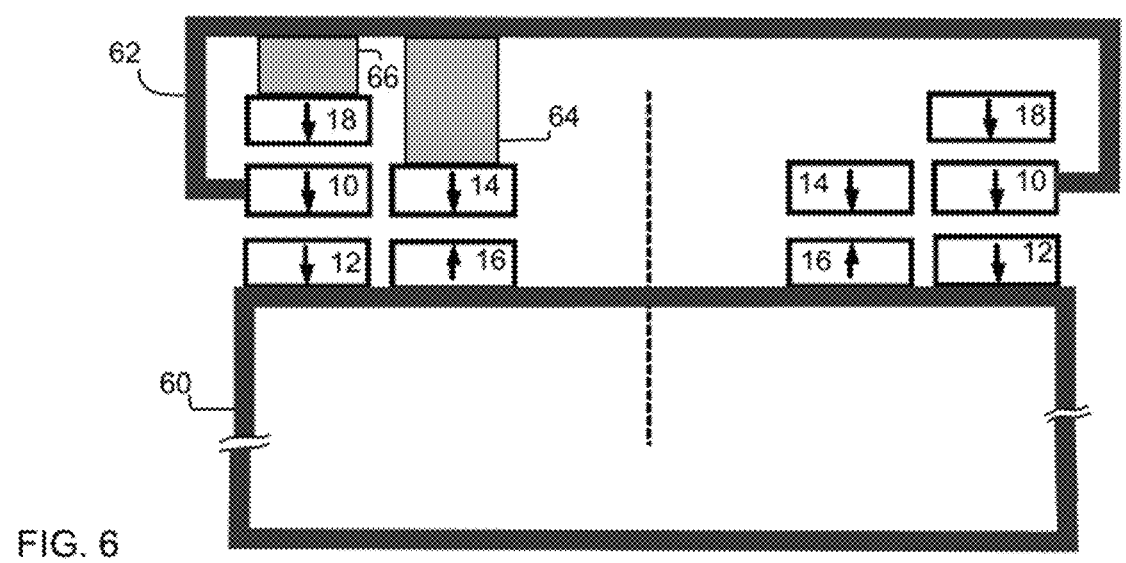
FIG. 6 shows an embodiment of the present invention where a rotor is suspended from above by a magnetic bearing.
Figure 7:
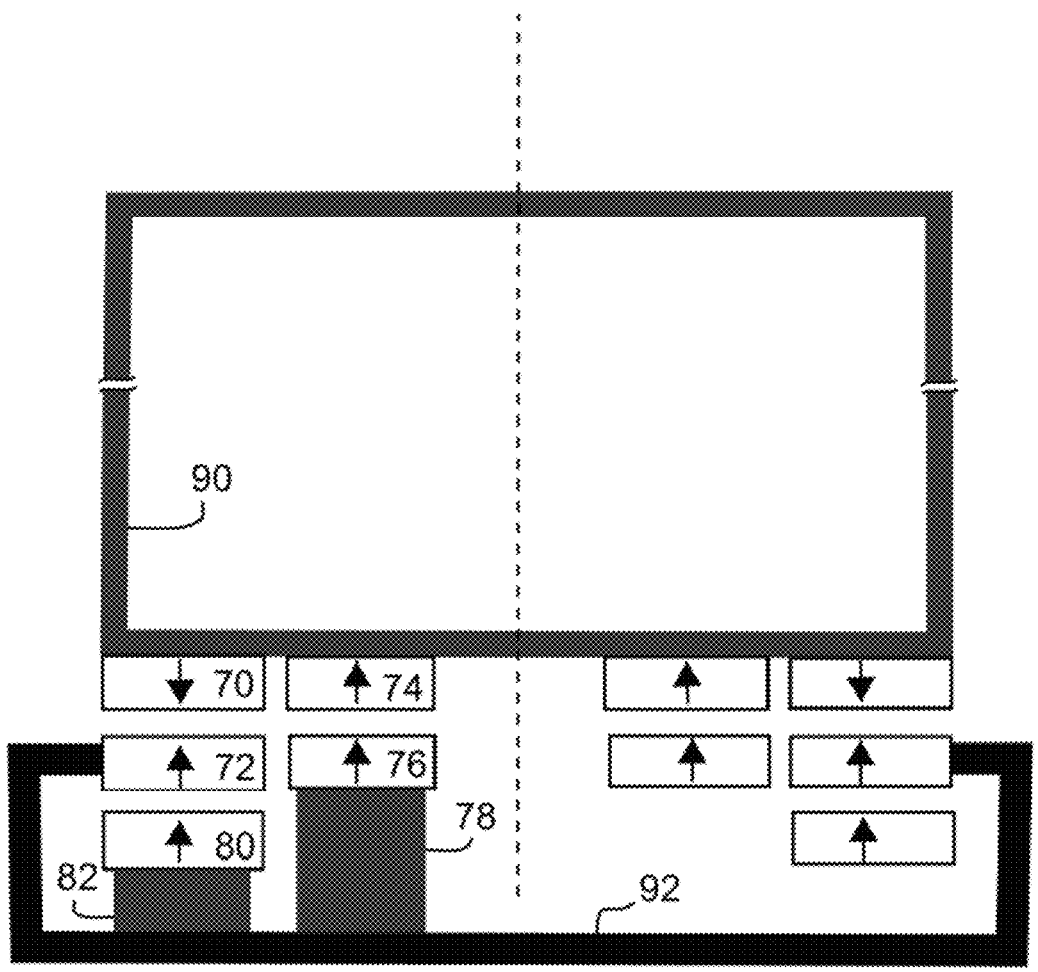
FIG. 7 shows an embodiment of the present invention where a rotor is lifted from beneath by a magnetic bearing.

FIG. 6 shows an implementation of the configuration of FIG. 5. Annular primary array 12 (also referred to herein as the first primary array comprising a first annular Halbach array) and annular secondary array 16 (also referred to herein as a first secondary array comprising a third annular Halbach array) are attached to the top of rotor 60. Primary annular array 10 (also referred to herein as a second primary array comprising a second annular Halbach array) is attached to support 62, which support is stationary relative to rotor 60. Secondary annular array 14 (also referred to herein as second secondary array comprising a fourth annular Halbach array) is adjustably attached, with an adjustment means 64, to support 62. The adjustment means 64 can be a simple threaded screw type means where turning the screw effects movement of the secondary annular array 14. Alternately, the adjustment means can be electronically activated, such as a solenoid or other servo mechanism that will moved the secondary array 14 relative to the support 62. Likewise, extra primary array 18 (comprising a fifth annular Halbach array) is adjustably attached, with an adjustment means 66, to support 62. In this embodiment, where the rotor is pulled upward to provide lift, the primary arrays 10, 12 are attracting. In one operational procedure, the primary arrays have a magnetic attraction (negative stiffness) that is stronger than required to produce a desired gap between the arrays attached to the rotor and those attached to the support 62, for a particular load (e.g., rotor weight). The force could be so strong that the two magnets touch. The secondary arrays 14 is moved such that it is close enough to secondary array 16 where their opposing force is sufficient to create the desired gap. Array 18 can be moved relative to support 62 such that the array comes into sufficient proximity to array 10 that it affects the overall attractive force between array 10 and array 12. The order of the steps of the above procedure can be varied.

FIG, 7 shows an implementation of the present invention for the purpose of providing lift to a rotor where the bearing is located under the rotor. In this configuration, lift is provided by the dual repelling annular Halbach arrays 70 and 72 where the primary array 70 (also referred to herein as first primary array comprising a first annular Halbach array) is attached to the rotor 90 and the primary array 72 (also referred to herein as a second primary array comprising a second annular Halbach array) is attached to a support 92 which support is stationary relative to the rotor 90. The dual secondary arrays, consisting of array 74 and array 76, are attracting one to another. Array 74 (also referred to herein as a first secondary array comprising a third annular Halbach array) is attached to the bottom of rotor 90 and array 76 (also referred to herein as a second secondary array comprising a fourth annular Halbach array) is adjustably attached, with an adjustable means 78, to support 92 in a manner similar to means 64 of FIG. 6. Based on this disclosure, those skilled in the art will understand that other adjustable means can be utilized to attach the various secondary and extra arrays to their support .The configuration also includes an extra array 80 (also referred to herein as a fifth annular Halbach array), which is also adjustable with means 82, and can be used to augment the repelling force which provides lift to rotor 90. Note that the configurations shown herein are exemplary only and are meant to illustrate the concept of the invention. Based on the present disclosure, those skilled in the art will understand that other configurations utilizing the principles of the present invention are possible.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:
1. An apparatus, comprising:
 a rotor;
 a first primary array comprising a first annular Halbach army attached to said rotor;
 a support structure configured to lie stationary with respect to said rotor;
 a second primary array comprising a second annular Halbach array attached to said support structure, wherein said first primary array and said second primary array are configured to interact magnetically one with another to provide a levitation force to said rotor;
 a first secondary array comprising a third annular Halbach array attached to said rotor;
 a second secondary array comprising a fourth annular Halbach array attached to said support structure, wherein said first secondary array and said second secondary array are configured to interact magnetically one with another to provide a force that is opposite to said levitation force to said rotor; and
 an extra primary array comprising a fifth annular Halbach array configured to augment said levitation force, wherein said extra primary array is attached to said support structure.

2. The apparatus of claim 1, further comprising adjustable means for attaching said extra primary array to said support structure.

3. The apparatus of claim 1, wherein said first primary array is attached to the upper side of said rotor, wherein said first primary array and said second primary array are magnetically attracting one to another, wherein said first secondary array and said second secondary array are magnetically repelling one to another, wherein said extra primary array is magnetically attracting to said second primary array.

4. An apparatus, comprising:
 a rotor;
 a first primary array comprising a first annular Halbach array attached to said rotor;
 a support structure configured to be stationary with respect to said rotor;
 a second primary array comprising a second annular Halbach array attached to said support structure, wherein said first primary array and said second primary array are configured to interact magnetically one with another to provide a levitation force to said rotor;
 a first secondary array comprising a third annular Halbach array attached to said rotor;
 a second secondary array comprising a fourth annular Halbach array attached to said support structure, wherein said first secondary array and said second secondary array are configured to interact magnetically one with another to provide a force that is opposite to said levitation force to said rotor; and
 a first adjustable means for attaching said second secondary array to said support structure and a second adjustable means for attaching said extra primary array to said support structure.

5. An apparatus, comprising:
 a rotor;
 a first primary array comprising a first annular Halbach array attached to said rotor;
 a support structure configured to be stationary with respect to said rotor;
 a second primary array comprising a second annular Halbach array attached to said support structure, wherein said first primary array and said second primary array are configured to interact magnetically one with another to provide a levitation force to said rotor;

a first secondary array comprising a third annular Halbach array attached to said rotor; and a second secondary array comprising a fourth annular Halbach array attached to said support structure, wherein said first secondary array and said second secondary array are configured to interact magnetically one with another to provide a force that is opposite to said levitation force to said rotor, wherein said third annular Halbach array and said fourth annular Halbach array have a shorter wavelength than that of said first annular Halbach array and said second annular Halbach array.

6. The apparatus of claim 5, wherein the lower face of said fourth annular Halbach array is displaced from the face of said third annular Halbach array.

7. The apparatus of claim 1, wherein said fifth annular Halbach array has a shorter wavelength than that of said first annular Halbach array and said second first annular Halbach array.

8. The apparatus of claim 1, wherein said first primary array is attached to the bottom side of said rotor, wherein said first primary array and said second primary array are magnetically repelling one to another, wherein said first secondary array and said second secondary array are magnetically attracting one to another, wherein said extra primary array is magnetically attracting to said second primary array.

\* \* \* \* \*